United States Patent
Farris et al.

(10) Patent No.: US 10,274,104 B2
(45) Date of Patent: Apr. 30, 2019

(54) HOT WATER HEATER SYSTEMS AND METHODS FOR MONITORING ELECTRONIC MIXING VALVES

(71) Applicant: General Electric Company, Schenectady, NY (US)

(72) Inventors: Brett Alan Farris, Lousiville, KY (US); Shaun Michael Ward, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 309 days.

(21) Appl. No.: 14/926,578

(22) Filed: Oct. 29, 2015

(65) Prior Publication Data

US 2017/0122458 A1 May 4, 2017

(51) Int. Cl.
| | |
|---|---|
| G05D 23/00 | (2006.01) |
| F16K 37/00 | (2006.01) |
| F24D 19/10 | (2006.01) |
| G05D 23/13 | (2006.01) |

(52) U.S. Cl.
CPC ...... *F16K 37/0091* (2013.01); *F24D 19/1051* (2013.01); *G05D 23/1393* (2013.01)

(58) Field of Classification Search
CPC ............ F16K 37/0091; F24D 19/1051; G05D 23/1858
See application file for complete search history.

(56) References Cited

U.S. PATENT DOCUMENTS

| | | | | |
|---|---|---|---|---|
| 4,941,608 | A | * | 7/1990 | Shimizu .............. F24D 19/1051 236/12.12 |
| 2009/0127867 | A1 | * | 5/2009 | Yuri ........................ F02D 29/06 290/40 R |
| 2014/0026970 | A1 | | 1/2014 | DuPlessis et al. |

FOREIGN PATENT DOCUMENTS

KR  20000019899  4/2000

* cited by examiner

*Primary Examiner* — P. Macade Nichols
(74) *Attorney, Agent, or Firm* — Dority & Manning, P.A.

(57) ABSTRACT

Hot water heater systems and methods for monitoring electronic mixing valves of hot water heater systems are provided. An electronic mixing valve provides a flow of water in a mixed output line. A method includes determining whether an output flow event is occurring, determining a first temperature value for water in the mixed output line when the output flow event is occurring, comparing the first temperature value to a setpoint temperature value to obtain a first temperature error value when the output flow event is occurring, and generating a failure signal when the first temperature error value is outside of a predetermined error range and the output flow event is occurring.

9 Claims, 2 Drawing Sheets

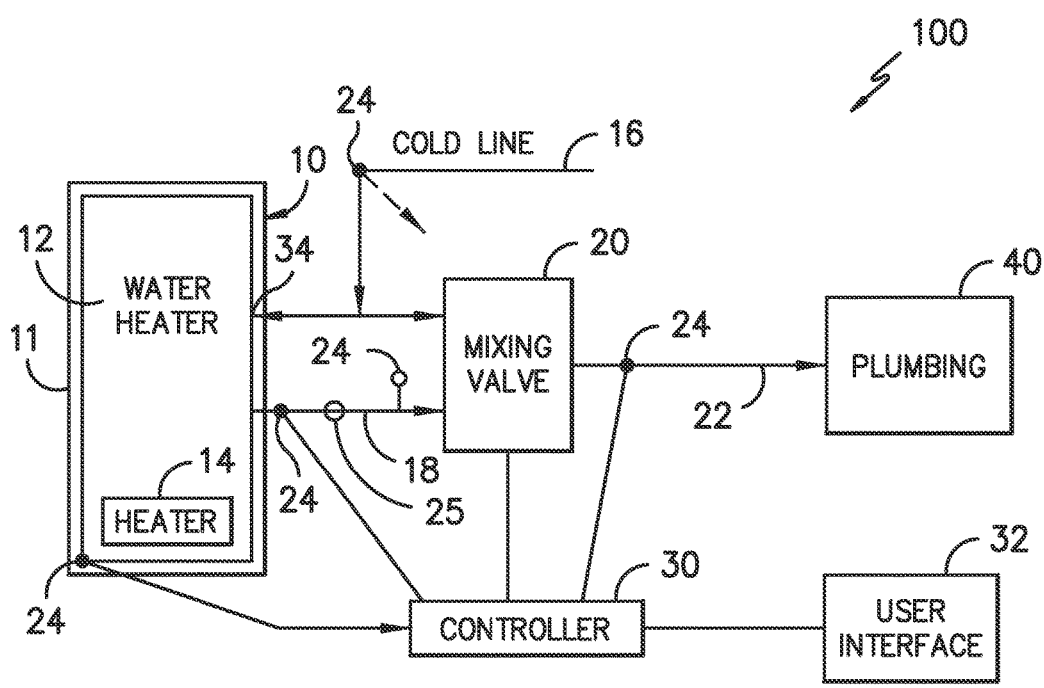
FIG. -1-

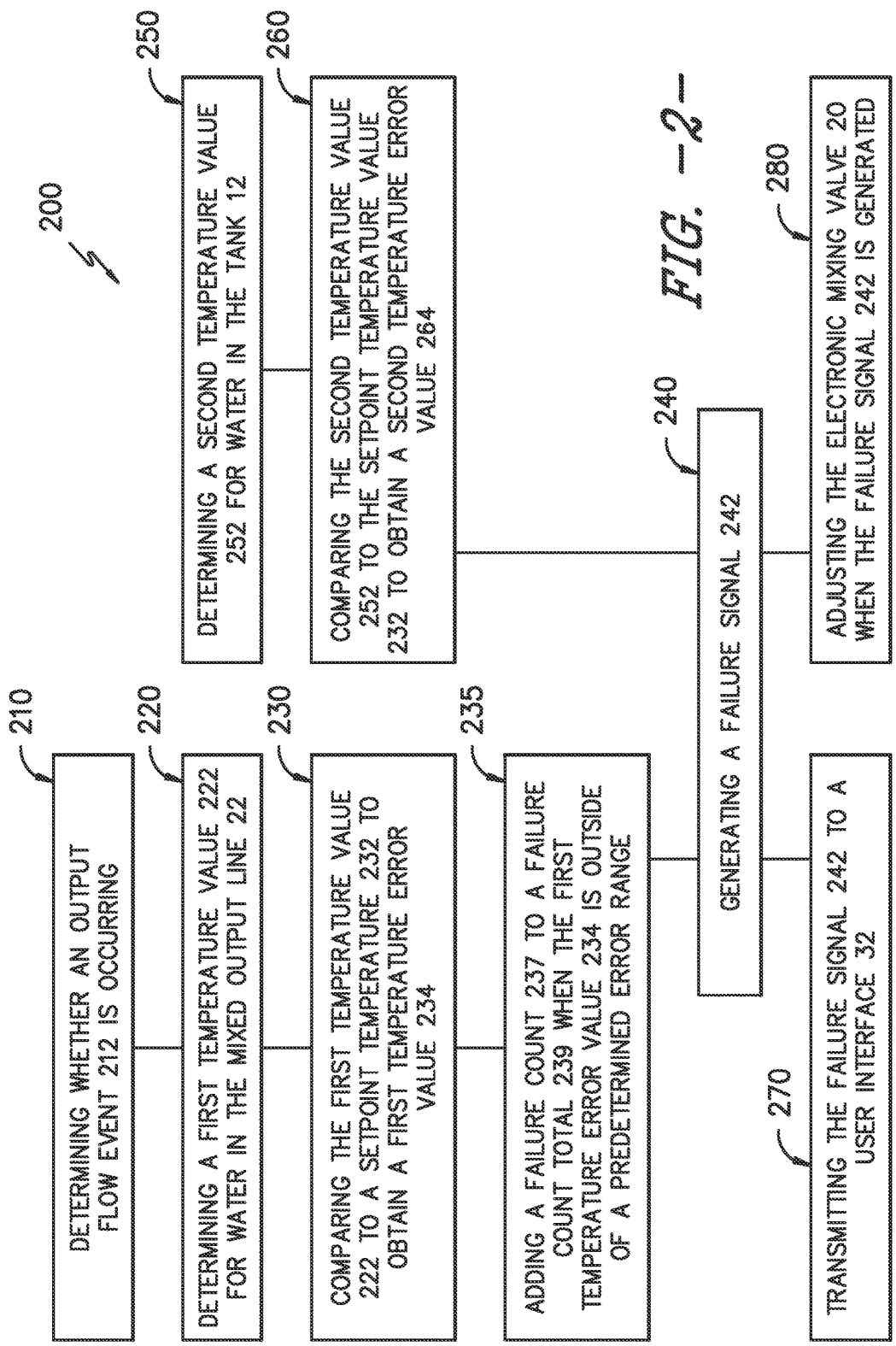

HOT WATER HEATER SYSTEMS AND METHODS FOR MONITORING ELECTRONIC MIXING VALVES

FIELD OF THE INVENTION

The present disclosure relates generally to hot water heater systems, and more particularly to methods for monitoring electronic mixing valves of hot water heater systems.

BACKGROUND OF THE INVENTION

Mixing valves in hot water heater systems are generally used to increase the hot water capacity of hot water tanks of the hot water heaters. By increasing the temperature of the hot water in the hot water tank, and then mixing the hot water flow from the hot water tank with cold water in a mixing valve, the realized capacity of the hot water tank is increased.

U.S. Patent Application Publication No. 2014/0026970, filed Jan. 30, 2014, entitled "Electronic Mixing Valve in Standard Hot Water Heater", and which is incorporated by reference in its entirety herein, discloses electronic mixing valves for use in hot water heaters. Electronic mixing valves generally provide improved control over the temperature of the water delivered from associated hot water heaters relative to, for example, mechanical mixing valves.

However, improvements could be made to presently known methods for controlling such electronic mixing valves. For example, one concern is that if an electronic mixing valve fails, water having a different temperature than desired by a user can be inadvertently provided to the user. This is of particular concern in cases wherein the temperature of the water stored in the tank is increased. If the electronic mixing valve fails, water that is significantly hotter than a desired temperature could be provided to the user, causing discomfort and potentially injuring the user. Accordingly, improved hot water heater systems and methods for monitoring electronic mixing valves are desired. In particular, improvements which monitor for indications if electronic mixing valve failure would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method for monitoring an electronic mixing valve of a hot water heater system is disclosed. The electronic mixing valve provides a flow of water in a mixed output line. The method includes determining whether an output flow event is occurring, determining a first temperature value for water in the mixed output line when the output flow event is occurring, comparing the first temperature value to a setpoint temperature value to obtain a first temperature error value when the output flow event is occurring, and generating a failure signal when the first temperature error value is outside of a predetermined error range and the output flow event is occurring.

In accordance with another embodiment of the present disclosure, a hot water heater system is disclosed. The hot water heater system includes a hot water tank having a cold water inlet line and a hot water outlet line, an electronic mixing valve fluid coupled to the cold water inlet line and the hot water outlet line, a mixed output line fluidly coupled to the electronic mixing valve, and a controller operatively coupled to the electronically controlled mixing valve. The controller is configured for determining whether an output flow event is occurring, determining a first temperature value for water in the mixed output line when the output flow event is occurring, comparing the first temperature value to a setpoint temperature value to obtain a first temperature error value when the output flow event is occurring, and generating a failure signal when the first temperature error value is outside of a predetermined error range and the output flow event is occurring.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic view of a hot water heater system 100 in accordance with one embodiment of the present disclosure; and FIG. 2 is a flow chart illustrating a method for monitoring an electronic mixing valve for a hot water heater in accordance with one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to FIG. 1, an exemplary hot water heater system 100 and hot water heater 10 therefor are provided. As shown, the hot water heater system 100 generally includes hot water heater 10, an electronic mixing valve 20 and a controller 30. In the embodiment of FIG. 1, the hot water heater 10 includes a reservoir or water storage tank 12 for storing water and a heat source 14 for heating the water stored in the tank 12. The tank 12 and heat source 14 are generally housed within a casing 11 of the hot water heater 10. In exemplary embodiments, the hot water heater 10 is a heat pump water heater, and the heat source 14 is thus a heat pump heating element. It should be understood, however, that the present disclosure is not limited to heat pump water heaters, and rather that any suitable water heaters may be utilized. Further, any suitable heat sources 14, including gas burners, heat pumps, electric resistance elements, microwave elements, induction elements, or any other suitable heating element or combinations thereof, may be utilized. The hot water heater system 10 includes an inlet 34 for receiving water from inlet line 16 for delivery into the tank 12. The water in the inlet line 16 is typically described as non-heated or "cold" water. The inlet line 16 is typically part of or connected to a water supply line for a home or building. The hot water heater system 10 also includes an outlet line 18 for supplying water from the tank 12 that has been heated to a pre-determined temperature, generally referred to herein as hot water. In the embodiment shown in FIG. 1, the outlet line 18 is coupled to the mixing valve 20. The mixing valve 20 may receive non-heated water from the inlet line 16 and heated water from the outlet line 18 and may mix the heated water with the non-heated water to reduce the temperature of the water from the mixing valve 20 that is delivered to the plumbing system 40. The mixing valve 20 includes a mixed outlet or output line 22 that delivers the heated water resulting from the mixing to the portions of the plumbing system 40 to which the hot water heater 10 is connected, generally referred to herein as the hot water portions of the hot water system. The plumbing system 40 can be part of a residential, commercial or other water plumbing system that incorporates a hot water heater.

As shown in FIG. 1, in these embodiments, the mixing valve 20 is fluidly connected to the inlet line 16 and the outlet line 18. The mixing valve 20 is coupled to the plumbing system 40 via the mixed output line 22. In one embodiment, the mixing valve 20 is an electronically controlled mixing valve and can include for example, a solenoid operated water valve and a gear or motor driven water valve. In alternate embodiments, any suitably controlled water mixing valve can be utilized to provide precise flow control such as for example, a servo or stepper motor coupled with a valve.

In exemplary embodiments, the mixing valve is disposed within the casing 11. Alternatively, however, the mixing valve may be external to the hot water heater 10.

In the embodiment shown in FIG. 1, the controller 30 is an electronic controller that is operatively coupled to the hot water heater 10 and the mixing valve 20. Controller 30 can include or be operatively coupled to, or be in communication with, one or more processor(s) that are operable to monitor and control the flow of hot water from the hot water tank 12 and heated water from the mixing valve 20, as well as execute the processes that are generally described herein. In one embodiment the controller 30 can include or receive machine-readable instructions that are executable by one or more processors or other suitable processing device(s). The processor(s) can include program code to perform particular tasks and/or data manipulations, as are generally described herein. In one embodiment, the processor(s) can include or be coupled to a memory and input/output devices. The memory typically includes both non-volatile memory, such as semiconductor type random access memory, and non-volatile memory such as a magnetic computer disk.

In one embodiment, the controller 30 is operatively coupled to and between, and is communication with, the hot water heater 10 and the mixing valve 20. The controller 30 can also include or be coupled to a user interface 32. In one embodiment, the controller 30 and user interface 32 form part of a home energy management (HEM) system. The user interface 32 can comprise any suitable control or display that will allow a user to program, set and adjust the functions and settings of the hot water heater system 100, as are generally described herein. In one embodiment, the user interface 32 comprises a display interface, such as a touch screen display. In alternate embodiments, the user interface 32 can include buttons or switches for manipulating and programming the settings of the system 100, including for example the set-point temperature. In one embodiment, the user interface 32 comprises or is part of a control panel for the hot water heater 10. The user interface 32 can also be located remotely from the hot water heater 10, and can be accessible through a computing device or a web based interface.

As is illustrated in FIG. 1, in one embodiment, the system 100 includes one or more temperature sensors 24 for detecting and monitoring the temperature of the water in the different portions of the system 100. In the example of FIG. 1, sensors 24, such as thermistors, are shown on or thermally coupled to one or more of the inlet line 16, the outlet line 18, the mixed output line 22 and the hot water tank 12. The sensor(s) 24 are generally configured to provide one or more signals or commands to the controller 30 that will allow the controller 30 to detect and determine temperature values for the water in various portions of the hot water system 100.

In one embodiment, the sensors 24 are coupled to the controller 30 via a wired or wireless communication connection or interface. For purposes of the description herein, wireless communication connections and interfaces can include, but are not limited to, wireless radio, WiFi, Bluetooth, Zigbee and ethernet wireless type devices and interfaces.

Further, in some embodiments, the system 100 includes one or more flow detectors 25. A flow detector 25, which may for example be a flow meter or flow valve, may be provided for detecting flow rates of water therethrough in different portions of the system 100. In the example of FIG. 1, a flow detector 25 is shown in the outlet line 18 for detecting flow, and a flow rate, therethrough. Additionally or alternatively, a flow detector 25 may be provided in the mixed output line 22 and/or at other suitable locations in the system 100. The flow detector(s) 25 are generally configured to provide one or more signals or commands to the controller 30 that will allow the controller 30 to detect and determine flow rates for the water in various portions of the hot water system 100.

In one embodiment, the flow detectors 25 are coupled to the controller 30 via a wired or wireless communication connection or interface. For purposes of the description herein, wireless communication connections and interfaces can include, but are not limited to, wireless radio, WiFi, Bluetooth, Zigbee and ethernet wireless type devices and interfaces.

Referring now to FIG. 2, various embodiments of methods for monitoring electronic mixing valves 20 for hot water heater systems 100 are provided. In general, such methods provide improved operation of controllers 30, electronic mixing valves 20, and systems 100 in general. For example, such methods may advantageously detect electronic mixing valve 20 failures and allow for actions to be taken to alleviate such failures. For example, the electronic mixing valve may be adjusted to prevent excessively hot or cold water from being provided to a user, and the user may be notified of the failure. Advantageously, such methods may be performed without the use of thermal cutoffs.

It should be noted that controllers 30 as disclosed herein are capable of and may be configured to perform any methods and associated method steps as disclosed herein.

For example, a method 200 may include the step 210 of determining whether an output flow event 212 is occurring. An output flow event is the active flow of water from the hot water heater 10 generally to the plumbing 40 and thus to a user, and thus can include the flow of water through inlet line 16 (to mixing valve 20), outlet line 18, electronic mixing valve 20, and/or mixed output line 22. The existence of an output flow event can be determined, for example, by determining whether a flow rate from the tank 12, through the outlet line 18, through electronic mixing valve 20, and/or through the mixed output line 22 is greater than zero or above a predetermined flow rate threshold. In some embodiments, a flow detector 25 may be utilized to determine such flow rate, and may transmit signals to the controller 30 to determine the flow rate and if an output flow event 212 is occurring. Alternatively, changes in temperature (as measured for example by a temperature sensor 24) or other suitable apparatus and/or techniques may be utilized (in exemplary embodiments in conjunction with controller 30) to determine a flow rate of water from the hot water heater 10 and thus to determine whether an output flow event is occurring.

Method 200 may further include, for example, the step 220 of determining a first temperature value 222 for water in the mixed output line 22. Such step 220 may, for example, occur when an output flow event 212 is occurring and due to such output flow event 212 occurring. For example, as discussed, a temperature sensor 24 may be operatively coupled to the mixed output line 22 and the controller 30. Temperature sensor 24 may transmit signals to the controller 30 to determine the temperature of the water in the mixed output line 22. Accordingly, the first temperature value 222 may be determined based on signals received from the temperature sensor 24. Alternatively, any suitable methods or apparatus may be utilized to determine the first temperature value 212.

In some embodiments, the determining step 220 may be performed immediately upon the determination that an output flow event 212 is occurring. In other embodiments, the determining step 220 may occur after a predetermined delay time period, which may for example be initiated upon determination (via step 210) that an output flow event 212 is occurring. The predetermined delay time period may, for example, be between 10 seconds and 45 seconds, such as between 15 seconds and 40 seconds, such as between 20 seconds and 30 seconds. This may allow the flow rate to stabilize before other method steps, as discussed herein, are performed.

Further, in some embodiments, the predetermined delay time period may reset when a change in a flow rate for the output flow event 212 is outside of a predetermined change range. For example, the predetermined change range may include a range of acceptable changes in flow rate (over time; i.e. flow rate slopes), and may in particular include a predetermined maximum change in flow rate. If a change in flow rate (as for example calculated by the controller 30 for the flow rate over a period of time, such as during the predetermined delay time period) is greater than the predetermined maximum change in flow rate, the predetermined delay time period may reset. This may further ensure that the flow rate is stable before other method steps, as discussed herein, are performed.

Method 200 may further include, for example, the step 230 of comparing the first temperature value 222 to a setpoint temperature value 232 to determine a first temperature error value 234. Such step 230 may, for example, occur when an output flow event 212 is occurring and due to such output flow event 212 occurring. In some embodiments, step 230 may further occur after the predetermined delay time period has expired. The setpoint temperature value 232 may be the value selected by a user for desired water output temperature within the mixed output line 22. For example, a user may select the setpoint temperature value 232 through use of the user interface 32. In general, when the electronic mixing valve 20 is operational and not failing, when a setpoint temperature value 232 is selected, the controller 30 and electronic mixing valve 20 may react to adjust the electronic mixing valve 20 such that the actual temperature of water within the mixed output line 22 is within a particular tolerance level of the setpoint temperature value 232.

In exemplary embodiments, comparing the first temperature value 222 to the setpoint temperature value 232 to determine the first temperature error value 234 includes subtracting the first temperature value 222 from the setpoint temperature value 232. The resulting first temperature error value 234 is thus in these embodiments the difference between the first temperature value 222 and the setpoint temperature value 232.

In some embodiments, a single comparison of the first temperature value 222 and setpoint temperature value 232 may be performed. In other embodiments, multiple comparisons over a period of time may be performed. For example, in some embodiments, the first temperature value 222 may be compared to the setpoint temperature value 232 for a predetermined time period (i.e. multiple times at a predetermined interval during the predetermined time period). The predetermined time period may, for example, be between 10 seconds and 45 seconds, such as between 15 seconds and 40 seconds, such as between 20 seconds and 30 seconds.

Method 200 may further include, for example, the step 240 of generating a failure signal 242 when the first temperature error value 234 is outside of a predetermined error range. Such step 240 may, for example, occur when an output flow event 212 is occurring and due to such output flow event 212 occurring. In exemplary embodiments, the predetermined error range may for example be between −2 degrees and 2 degrees, such as between −1 degree and 1 degree, such as between −0.75 degrees and 0.75 degrees, such as between −0.5 degrees and 0.5 degrees.

Notably, in embodiments wherein the first temperature value 222 is compared to the setpoint temperature value 232 in step 230 for a predetermined time period, the failure signal 242 may be generated when the first temperature error value 234 is outside of the predetermined error range at any time during the predetermined time period. In other words, if at any one interval during the predetermined time period when the first temperature value 222 is compared to the setpoint temperature value 232 the resulting first temperature error value 234 is outside of a predetermined error range, a failure signal 242 may be generated.

Notably, when a failure signal 242 is generated, further comparisons for the remainder of the predetermined time period may in some embodiments be ceased. Alternatively, such comparisons may continue for the remainder of the predetermined time period.

In some embodiments, method 200 may further include the step 235 of adding a failure count 237 to a failure count total 239 when the first temperature error value 234 is outside of a predetermined error range. For example, the failure count total 239 may be a counter programmed into the controller 30, and a failure count 237 may be added to the failure count total 239 when the first temperature error value 234 is outside of a predetermined error range. In these embodiments, after the failure count 237 is added, various steps such as steps 210, 220 and/or 230 may be repeated if the failure count total 239 does not meet or exceed a failure count threshold. The failure count threshold may, for example, be one, two, three, four, five or more failure counts 237. When the failure count total 239 meets or exceeds the failure count threshold, the failure signal 242 may be generated as discussed.

In some embodiments, a method 200 in accordance with the present disclosure may further include secondary steps for determining whether the electronic mixing valve 20 has failed. Such steps may be utilized, for example, in cases wherein water in the tank 12 is at a temperature that is less than or equal to the setpoint temperature value 232. For example, method 200 may include the step 250 of determining a second temperature value 252 for water in the tank 12. Such step 250 may, for example, occur when an output flow event 212 is occurring and due to such output flow event 212 occurring. For example, as discussed, a temperature sensor 24 may be operatively coupled to the tank 12 and the controller 30. Temperature sensor 24 may transmit signals to the controller 30 to determine the temperature of the water in the tank 12. Accordingly, the second temperature value 252 may be determined based on signals received from the temperature sensor 24. Alternatively, any suitable methods or apparatus may be utilized to determine the second temperature value 252.

In some embodiments, the determining step 250 may be performed immediately upon the determination that an output flow event 212 is occurring. In other embodiments, the determining step 250 may occur after the predetermined delay time period as discussed above. Further, in some embodiments, the predetermined delay time period may reset when a change in a flow rate for the output flow event 212 is outside of a predetermined change range, as discussed above.

Method 200 may further include, for example, the step 260 of comparing the second temperature value 252 to the setpoint temperature value 232 to determine a second temperature error value 264. Such step 260 may, for example, occur when an output flow event 212 is occurring and due to such output flow event 212 occurring. In some embodiments, step 260 may further occur after the predetermined delay time period has expired.

In exemplary embodiments, comparing the second temperature value 252 to the setpoint temperature value 232 to determine the second temperature error value 264 includes subtracting the second temperature value 252 from the setpoint temperature value 232. The resulting second temperature error value 264 is thus in these embodiments the difference between the second temperature value 252 and the setpoint temperature value 232.

In some embodiments, a single comparison of the second temperature value 252 and setpoint temperature value 232 may be performed. In other embodiments, multiple comparisons over a period of time may be performed. For example, in some embodiments, the second temperature value 252 may be compared to the setpoint temperature value 232 for a predetermined time period (i.e. multiple times at a predetermined interval during the predetermined time period). The predetermined time period may, for example, be between 10 seconds and 45 seconds, such as between 15 seconds and 40 seconds, such as between 20 seconds and 30 seconds.

In these embodiments, the failure signal 242 may be generated when, additionally or alternatively to the requirements as discussed above, the second temperature error value 264 is outside of a second predetermined error range. In exemplary embodiments, the predetermined error range may for example be between −2 degrees and 2 degrees, such as between −1 degree and 1 degree, such as between −0.75 degrees and 0.75 degrees, such as between −0.5 degrees and 0.5 degrees. Notably, such generation may only occur in these embodiments when the second temperature value 252 is less than or equal to the setpoint temperature value 232.

Notably, in embodiments wherein the second temperature value 252 is compared to the setpoint temperature value 232 in step 260 for a predetermined time period, the failure signal 242 may be generated when the second temperature error value 264 is outside of the predetermined error range at any time during the predetermined time period. In other words, if at any one interval during the predetermined time period when the second temperature value 252 is compared to the setpoint temperature value 232 the resulting second temperature error value 264 is outside of a predetermined error range, a failure signal 242 may be generated.

When the failure signal 242 is generated, various steps may occur to alert a user to the potential failure of the electronic mixing valve 20 and/or to at least temporarily alleviate issues that may be caused by such failure. For example, in some embodiments, method 200 may further include, for example, the step 270 of transmitting failure signal 242 to the user interface 32. When the user interface 32 receives the failure signal 242, an alert, such as a visual (light, text, etc.) or auditory (bell, tone, etc) alert may be generated in the user interface 32 to alert a user to the potential failure of the electronic mixing valve 20. Additionally or alternatively, in some embodiments, method 200 may further include, for example, the step 280 of adjusting the electronic mixing valve 20 when the failure signal 242 is generated. For example, the electronic mixing valve 20 may be adjusted to a more open position if there is an indication that the valve 20 failed closed, or may be adjusted to a more closed position if there is an indication that the valve 20 failed open.

Notably, in exemplary embodiment predetermined periods, ranges, values etc. as discussed herein may be programmed into the controller 30. Such variables may be user adjustable (i.e. by a user via user interface 32) and/or may initially be factory settings for the water heater 10 and system 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hot water heater system, comprising:
   a hot water tank having a cold water inlet line and a hot water outlet line;
   an electronic mixing valve fluid coupled to the cold water inlet line and the hot water outlet line;
   a mixed output line fluidly coupled to the electronic mixing valve; and
   a controller operatively coupled to the electronically controlled mixing valve and configured for:
      determining whether an output flow event is occurring;
      determining a first temperature value for water in the mixed output line when the output flow event is occurring;

comparing the first temperature value to a setpoint temperature value to obtain a first temperature error value when the output flow event is occurring;

adding a failure count to a failure count total when the first temperature error value is outside of a predetermined error range and the output flow event is occurring; and generating a failure signal when the first temperature error value is outside of a predetermined error range and the output flow event is occurring and the failure count total exceeds a failure count threshold;

wherein the hot water heater system does not include a thermal cutoff.

2. The hot water heater system of claim 1, wherein the first temperature value is compared to the setpoint temperature value for a predetermined time period, and wherein the failure signal is generated when the first temperature error value is outside of the predetermined error range at any time during the predetermined time period.

3. The hot water heater system of claim 2, wherein the predetermined time period is between 10 seconds and 45 seconds.

4. The hot water heater system of claim 1, wherein the predetermined error range is between −1 degree Fahrenheit and 1 degree Fahrenheit.

5. The hot water heater system of claim 1, wherein the step of determining the first temperature value occurs after a predetermined delay time period, the predetermined delay time period initiated upon determination that the output flow event is occurring.

6. The hot water heater system of claim 5, wherein the predetermined delay time period resets when a change in a flow rate of the output flow event is outside of a predetermined change range.

7. The hot water heater system of claim 1, wherein the controller is further configured for:

determining a second temperature value for water in the tank when the output flow event is occurring;

comparing the second temperature value to the setpoint temperature value to obtain a second temperature error value when the output flow event is occurring, and wherein, when the second temperature value is less than or equal to the setpoint temperature value, the failure signal is generated when the second temperature error value is outside of a second predetermined error range.

8. The hot water heater system of claim 1, wherein the controller is further configured for adjusting the electronic mixing valve when the failure signal is generated.

9. The hot water heater system of claim 1, wherein the controller is further configured for transmitting the failure signal to a user interface of the hot water heater system.

* * * * *